June 17, 1947. D. H. MANNEY Re. 22,890

BREATHER PLUG FOR ELECTRIC MOTORS

Original Filed Nov. 24, 1941 2 Sheets-Sheet 1

INVENTOR
DAVID H. MANNEY
BY
Spencer, Hardman & Fehr
HIS ATTORNEYS.

June 17, 1947. D. H. MANNEY Re. 22,890

BREATHER PLUG FOR ELECTRIC MOTORS

Original Filed Nov. 24, 1941 2 Sheets-Sheet 2

INVENTOR
DAVID H. MANNEY
BY
Somers, Vanderwaart & Fisher
HIS ATTORNEYS

Reissued June 17, 1947

Re. 22,890

UNITED STATES PATENT OFFICE 22,890

BREATHER PLUG FOR ELECTRIC MOTORS

David H. Manney, Dayton, Ohio, assignor to General Motors Corporation, Detroit, Mich., a corporation of Delaware Original No. 2,323,146, dated June 29, 1943, Serial No. 420,215, November 24, 1941. Application for reissue May 1, 1945, Serial No. 591,241

6 Claims. (Cl. 172—36)

This invention relates to an improved protective device for electric machines and especially electric machines or electric motors used in a substantially inflammable atmosphere in which fire or explosion might take place as a result of sparking in the machine or motor.

Electric machines and particularly electric motors are commonly used as driving means for gas or gasoline pumps, apparatus in coal mines, chemical works or other plants where dust-laden air or atmosphere charged with inflammable or explosive gases or vapors are invariably present. If an ordinary open type motor is used under such circumstances, the charged atmosphere in and surrounding the motor may readily be ignited by sparking at the brushes, collector rings or any other part of the motor capable of an electric discharge tending to produce a spark, thus resulting in much damage and perhaps disastrous fire or explosion. To avoid this, special motors are available, these motors having casings or housings with predetermined clearances between parts comprising the housing, said clearances providing communicating ducts between the interior and exterior of the housing which act as breather openings of such dimensions as to prevent flame propagation from the interior to the exterior of the motor housing in case the charged air or gas within the motor is ignited by sparking therein.

To produce motors provided with such breather spaces or ducts between interfitting parts forming the motor housing requires careful and tedious machining and working at close tolerances, for if such spaces or ducts are too small, explosions within the motor cannot properly be relieved. The restriction offered by too small ducts or spaces would unduly subject the motor to the forces of the explosion therein, which would result in damage thereto and in some instances might even cause bursting of the motor casing thereby resulting in igniting of the surrounding charged atmosphere.

In case the spaces or ducts just referred to are too large, proper impedance to flame propagation would not be offered, in which instance the motor would of itself not be damaged, but again the exterior, charged atmosphere would be ignited. Thus it may be seen that such breather spaces or clearances must necessarily be maintained within exceedingly close limits, requiring therefore tedious and careful machining of inter-fitting parts of the motor casing.

It is among the objects of the present invention to provide an electric motor having a sealed casing or housing with a breather plug or plugs which establish communication between the interior and exterior of the housing. The provision of such plugs thus eliminates the necessity of maintaining machine operations upon interfitting parts of the motor casing within such exceedingly close limits, for the plugs in the present instance provide the breather elements instead of the carefully designed ducts or spaces formed between inter-fitting parts of the motor housing.

The breather plugs of the present invention are made from a sintered, non-compacted metal powder, presenting an indefinitely large number of small and tortuous paths or ducts through which atmosphere may be drawn into or ejected from the interior of the motor housing. These plugs with their small and tortuous paths or ducts prevent the propagation of flame from the motor housing in case an inflammable or explosive atmosphere or gas, drawn into and filling the motor, has been ignited by sparking within the motor housing.

The character of the plugs and especially the tensile strength of the metal particles comprising the plugs are such that high resistance to fracture, caused by pressure resulting either from explosion or freezing of condensed moisture within the plug, is provided. Thus the possibility of reducing or even entirely destroying the protective function of a breather element for the casing of an electric motor such as commonly used fibrous packing, porous plastics, ceramics or porcelain and the like, which are destructible and fragile underconditions mentioned, is substantially eliminated by the present type of plug which is adapted to withstand high pressure and continue its protective function under the most adverse circumstances.

The plugs of the present invention are adapted to be used not only for the prevention of flame propagation, but function also as drain plugs, permitting condensed moisture to be ejected from within the casing and also as filters for the lubricating system of the device.

Further objects and advantages of the present invention will be apparent from the following description, reference being had to the accompanying drawings wherein a preferred embodiment of the present invention is clearly shown.

Figure 1:
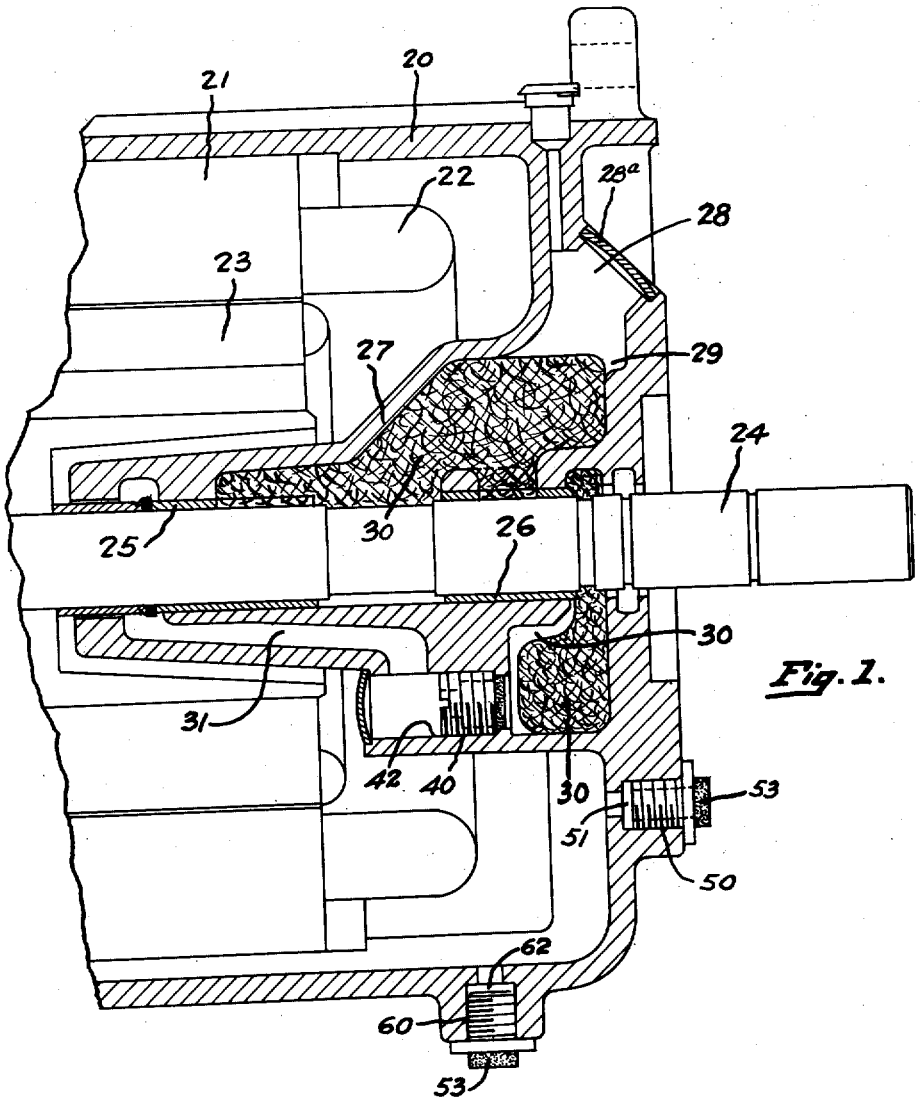
Fig. 1 is a fragmentary sectional view of an electric motor equipped with the present invention.

Referring to the drawings and particularly to Fig. 1, the numeral 20 designates the housing or casing of the electric motor. Pole shoes 21 are supported within the housing carrying the field windings 22. A rotor or armature 23 is rotatably supported by the motor shaft 24 journalled in sleeve bearings 25 and 26, said bearings being held in coaxial alignment within the housing 20 in any suitable manner.

The housing 20 has an inwardly extending cone-shaped shell portion 27 forming an interior chamber which is in communication with the outside of the motor housing through a neck or passage 28. This chamber comprises two compartments, the one designated by the numeral 29, which may be termed the "lubricating oil reservoir," the compartment 30 which may be termed the "sump" for the lubricant containing reservoir 29. Both these compartments, the reservoir 29 and the sump 30, are in communication with each other. Fibrous material of any suitable type designated by the numeral 30a is placed within these compartments, this fibrous material being soaked with the lubricant, the fibrous material in the sump acting as a wick to lift the lubricant from the sump up to the reservoir. Openings in the bearings 25 and 26 permit this fibrous material to contact with the exposed portion of the rotating armature shaft 24 and thereby direct the lubricant upon the shaft. A duct 31 provides communication between the reservoir compartment 29 and the sump compartment 30 so that lubricant flowing along the shaft through the bearing 25 may enter duct 31, flow therethrough and enter the sump 30 from where said lubricant will again be lifted by the fibrous material into the reservoir 29, thus creating a lubricant circulating system. With the bearing 25 in the opening of the cone-shaped shell 27 and the shaft 24 in the bearing it may readily be seen that the interior of the motor casing 20 containing the field and armature and containing also the usual brushes or collector ring mechanism, not shown in the present drawings, is completely shut off or isolated from the chamber containing the lubricant charged fibrous material 31.

Figure 4:
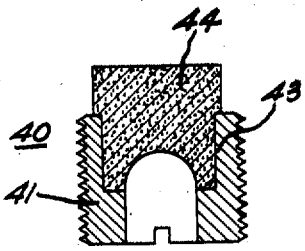

In the duct 31 there is provided a plug of the present invention, this plug assembly being designated by the numeral 40. In the drawing it may be seen that the plug is located in the duct between the sump 30 and the other end of the duct which communicates with the reservoir portion 29 through the clearance spaces provided between the bearing 25 and the shaft 24. This plug 40 is of the type as designated in the Fig. 4 and comprises a sleeve 41 exteriorly threaded so as to be threadedly received by the portion 42 of duct 31. The sleeve 41 is counterbored as at 43 to receive the body of sintered non-compacted metal powder 44. This plug portion 44 may be formed from any number of metal powders such as copper and tin powders, copper and nickel powder, iron powder and copper or other suitable powdered metals and may include small quantities of non-metallic materials such as graphite and the like. The method of making such a porous metal plug is well known in the art and one of such methods is detailedly described in the Patent 2,198,702, issued to R. P. Koehring, April 30, 1940. Sufficient to say that the sintered, non-compacted metal plug 44 is of such a character that it provides indefinitely large number of small and tortuous paths or ducts through which fluids may pass. Thus the presence of this porous metal plug 40 in the oil conducting duct 31 of the motor acts as a filter for the oil passing through duct 31 to the oil sump 30.

This porous, non-compacted metal plug 40 also acts as an arrester for preventing the propagation of flame passing through the duct 31 toward the oil containing sump 30 and reservoir 29 and in communication with the outside of the metal through the neck or opening 28 normally closed by a Welsh plug 28a. If a motor is used in an installation surrounded by a charged atmosphere, that is, an atmosphere laden with an explosive or combustible dust or gas, any ventilating air so charged and drawn into the motor may readily be ignited by sparking of the brushes, collector rings or any part of the electric motor capable of giving off a spark. Such explosion will, due to its pressure, tend to thrust the flame through any opening it may find, as for instance through the clearance space between the shaft 24 and the inner end of the bearing 25 so that this flame could be directed into duct 31 and therethrough into the lubricant containing chambers 29 and 30 if no impedance were provided in the duct. However, with the provision of the porous metal plug 40 in duct 31, which provides innumerable small and tortuous paths, the propagation of the flame from duct 31 and its portion 42 through the plug 40 is entirely eliminated, for the small tortuous paths, will not permit the flame to pass therethrough and into the lubricant containing chambers 30 and 29. Thus the possibility of flame within the motor escaping to the exterior of the motor to ignite surrounding charged atmosphere is substantially eliminated.

Another porous plug 50 is screw threadedly received in an opening 51 in the casing 20 of the motor providing direct communication between the exterior of the motor and the interior portion thereof containing the fields, armature and brushes or collector ring mechanism thereof. This plug 50 is of the type shown in the Fig. 5 where a flanged collar 52, exteriorly threaded, has an elongated plug 53 made from sintered, non-compacted metal power of the same character as plug 40. This plug 50 permits the motor to breathe ventilating air into its interior, and like plug 40, prevents flame propagation from the interior of the motor to the exterior thereof in case an explosion occurs within the motor. Another plug 60 of the same type as plug 50, is provided in an opening 62 at the bottom of the motor casing 20, this plug 60 providing an exit for any condensed moisture that may gather at the bottom of the motor, this plug also preventing any flame propagation in case of an explosion within the motor.

From the aforegoing it may be seen that the motor as illustrated in Fig. 1 has three porous metal plugs 40, 50 and 60, all having a common function, that is the function of preventing flame propagation from the interior of the motor to the exterior thereof in case an explosion occurs within the motor. The plug 40 acts also as an oil filter and the plug 50 has an additional function of providing a breather permitting ventilating air to enter into the motor and the plug 60 acting also as a drain permitting any fluids present in the bottom of the motor casing to escape therefrom.

Figure 2:
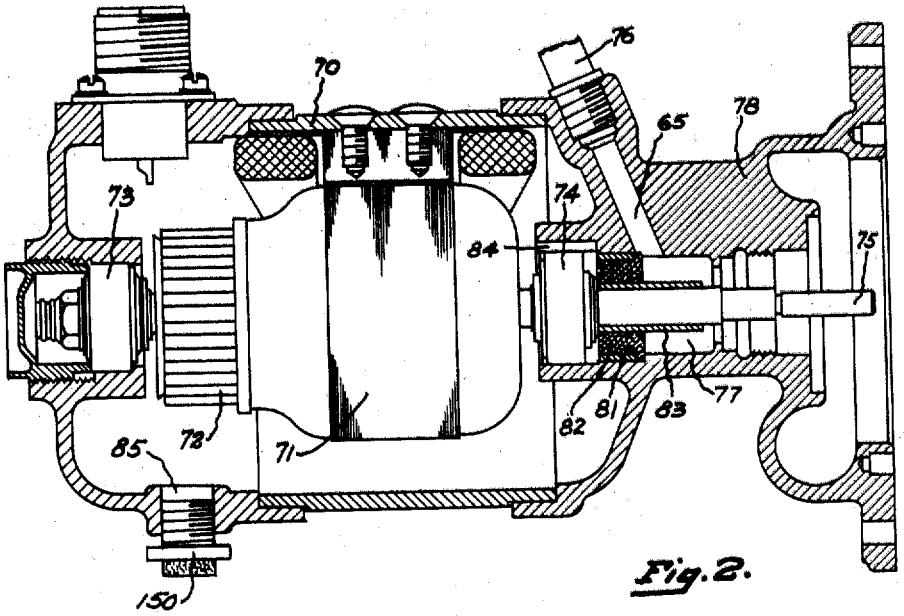
Fig. 2 is a longitudinal view, partly in section, showing the invention applied to another type of electric motor.

In Fig. 2 another type of electric motor is illustrated. This motor is adapted to be used as a driving element for gas or gasoline pumps, superchargers or the like. In driving gasoline pumps or superchargers a motor of this type forms a part of the equipment used on an airplane and in certain instances, especially when reaching high altitudes, is subjected to extremely low freezing temperatures. This motor comprises a housing 70, an armature 71, a commutator 72 thereof being provided with the usual brush mechanism, not illustrated in the present instance. This armature has a shaft 75 supported by two roller bearings 73 and 74 carried in the housing. The end of the armature shaft 75 is connected to the driven element which may be a gas pump, a supercharger or the like, said gas pump or supercharger sometimes giving off inflammable and explosive gases which offtimes find their way along the shaft and into the interior of the motor. Such gases within the motor are readily ignited by any sparking that might occur at the brush mechanism and in some instances an explosion within the motor takes place which, if the flame thereof is permitted to be propagated and find its way outside of the motor would cause explosions. In order to eliminate such flame propagation, motors of this type are usually ventilated by a forced air circulation being directed into the motor in any suitable manner. In the construction shown in Fig. 2, a duct 65 leads to the exterior of the motor and has a pipe 76 connected thereto which is connected to either a suction or a pressure pump adapted to draw air from the motor through duct 65 or on the other hand force air through duct 65 into the motor. This duct 65 leads into a chamber 77 formed in the end housing 78 of the motor. In one end of said chamber the roller bearing 74 is provided. In this chamber there is provided also a porous metal plug 80 between duct 65 and bearing 74, this plug comprising an outer sleeve 81 which contains the porous metal plug body 82 made from a sintered, non-compacted metal powder similar to the plugs 40 and 50 respectively shown in Figs. 4 and 5. An elongated tubular sleeve 83 extends through the porous metal plug 82, the shaft 75 of the armature extending through this elongated tube 83 which has a rotating fit about said shaft. A duct or passage 84 is provided on the outside of ball bearing 74, this duct connecting the space outwardly of the bearing with the interior of the motor casing so that ventilating air passing from duct 65 through the porous plug 82 may enter the interior of the motor through duct 84 instead of passing through the ball bearing 74.

Figure 5:
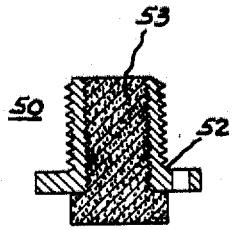
Figs. 4 and 5 are enlarged sectional views showing the detailed construction of plugs comprising a body of sintered, non-compacted metal powder.

In any suitable location in the housing of the motor, preferably adjacent the bottom thereof, a plug 150 is provided in an opening 85 in said motor housing, this plug 150 being of the type illustrated in the Fig. 5 and therefore having an elongated body made from a sintered non-compacted metal powder. The plug 150 acts as an egress for the ventilating air of the motor casing when the pressure pump connected with pipe 76 forces the air down into the duct 65. Where a suction pump is connected with pipe 76 plug 150 acts as an entrance for air into the interior of the motor casing 70. In case such ventilating air is of an inflammable or explosive nature or in case exploding gases find their way from the mechanism driven by shaft 75 through the housing portion 78 into chamber 77 thereof and from there are introduced into the interior of the motor by the forced ventilating air, these two plugs 82 and 150 will prevent flame propagation should such inflammable atmosphere within the motor be ignited by sparking at the brushes on the commutator or any other place within the motor.

Figure 3:
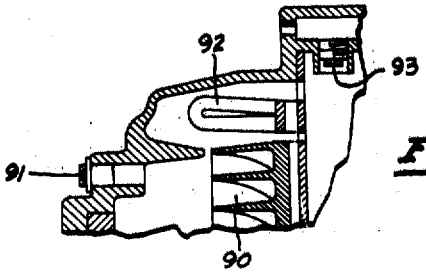
Fig. 3 is a fragmentary view of still another type of motor equipped with the present invention.

In Fig. 3 is illustrated a fragmentary portion of a motor in which the air circulating mechanism in the form of a fan 90 is within the motor and driven by its rotating part directly. In this instance fan 90 causes air to be drawn into the motor through a plug 91 like that shown in Fig. 5 this air passes around the field windings 92 of the motor and other parts to cool them and finally exiting from the interior of the electric motor through plug 93 identical with the plug shown in Fig. 4. Plugs 91 and 93 thus act as breathers capable of preventing any flame propagation resulting from an explosion within the motor housing.

The device shown in Fig. 2 is, as has been said, at times subjected to very low freezing temperatures especially when the plane upon which it is used is traveling at high altitude. Any condensation which might take place within the motor and which might accumulate in plugs 82 and 150 wound be formed into ice in said plugs, the freezing of said moisture resulting in a terrific pressure being exerted upon the particles making up the porous plugs. Innumerable experiments have been made in connection with these plugs, and during these experiments said plugs were laden with water and subjected to as low as 40° below zero Fahrenheit and in each instance no damage resulted. These tests also showed this type of plug as being capable of withstanding extremely high pressure caused by the forcing of air or atmosphere therethrough due to an explosion. In none of these experiments to which these plugs were subjected was the plug injured in any manner such as to prevent complete functioning thereof. Thus it may be seen that these porous plugs made from a sintered, non-compacted metal powder, are comparatively strong, being capable of withstanding extreme pressures such as are exerted in case of moisture within the plugs being frozen or the forcing of atmosphere under pressure as the result of an explosion. Fibrous materials, porous plastics, ceramics or porcelain and the like when used under such circumstances do not provide sufficient strength to withstand the extreme pressure and tend to fracture or crack when subjected thereto, thereby entirely destroying the function for which they are intended in any instance of this kind. Fracture of a plastic in any installation as disclosed in the drawing would necessarily permit flame propagation from the interior to the exterior of the motor thereby permitting flames resulting from an explosion within the motor to be directed exteriorly of the motor and ignite the surrounding inflammable or explosive atmosphere, thus resulting in a damaging and dangerous fire or explosion outside the motor.

While the embodiment of the present invention as herein disclosed constitutes a preferred form, it is to be understood that other forms might be adopted, all coming within the scope of the claims which follow.

What is claimed is as follows:

1. In combination with an electric machine having a sealed casing, of a breather plug in said casing adapted to prevent the propagation of flame caused by the explosion of gas vapors ignited by sparking in the interior of the casing, said breather plug comprising a body consisting of sintered, non-compacted metal powder.

2. In combination with an electric machine having a sealed casing, of a porous metal plug in said casing providing for the transfer of air into and out of said casing, the draining of any moisture within the casing due to condensation and for the prevention of flame propagation caused by the explosion of gas vapors ignited by sparking within the casing of the electric machine, said plug comprising an elongated body consisting of sintered, non-compacted metal powder.

3. An electric machine having a casing providing bearings; an operating shaft supported in said bearings; an oil reservoir in the casing; an oil sump in the casing; an oil conducting duct leading from one bearing in communication with the reservoir to the sump; a porous metal plug in said duct between the bearing and the sump for preventing the propagation of flame to the oil containing sump and for filtering the oil; and a second porous metal plug in the casing of the electric machine, providing both a breather for said casing and a means for preventing flame propagation caused by the explosions of gas vapors ignited by sparking in the interior of the electric machine, both of said porous plugs being made from a sintered, non-compacted metal powder.

4. In combination with an electric motor provided with a sealed casing, a duct leading into said casing for the introduction of a forced current of air into the casing; second a duct in the casing providing for the egress of said air; a plug in each duct, each plug comprising a body consisting of sintered, non-compacted metal powder providing an indefinitely large number of small and tortuous paths or ducts through which the air passes and which prevent the propagation of flame resulting from the igniting of an inflammable or explosive atmosphere drawn into and filling the motor casing.

5. A rotary electric motor having a casing at least a portion of which comprises a body consisting of sintered, non-compacted metal powder said portion of the casing providing a ventilator for the motor which prevents flame propagation.

6. An electric machine which inherently sparks during operation thereof including a sealed casing therearound, at least a portion of said casing comprising a ventilator consisting of sintered non-compacted metal powder, said ventilator permitting inhalation and exhalation of gases into and out of the casing and simultaneously preventing flame propagation therethrough.

DAVID H. MANNEY.

REFERENCES CITED

The following references are of record in the file of this patent:

UNITED STATES PATENTS

| Number | Name | Date |
|---|---|---|
| 522,972 | Cuttriss | July 17, 1894 |
| 2,017,491 | Gloveacki | Oct. 15, 1935 |